Figure 1:
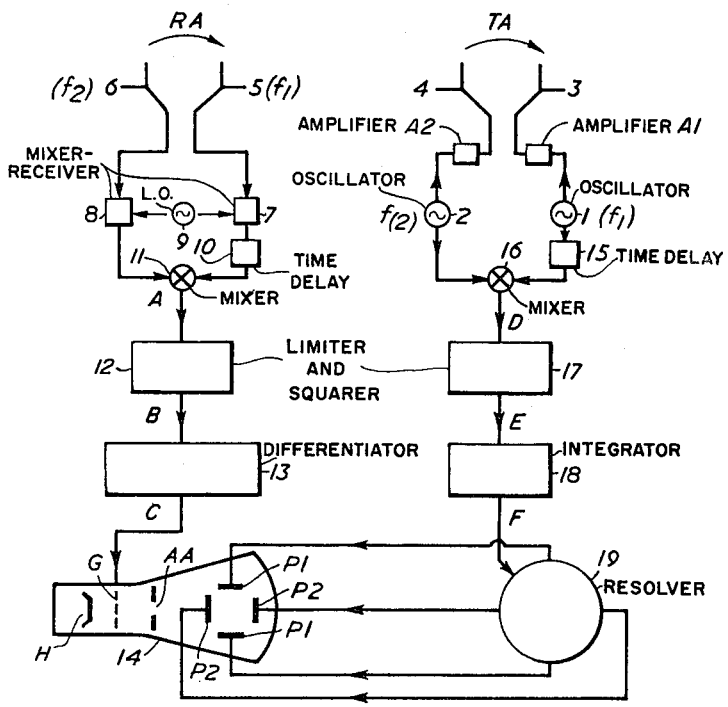

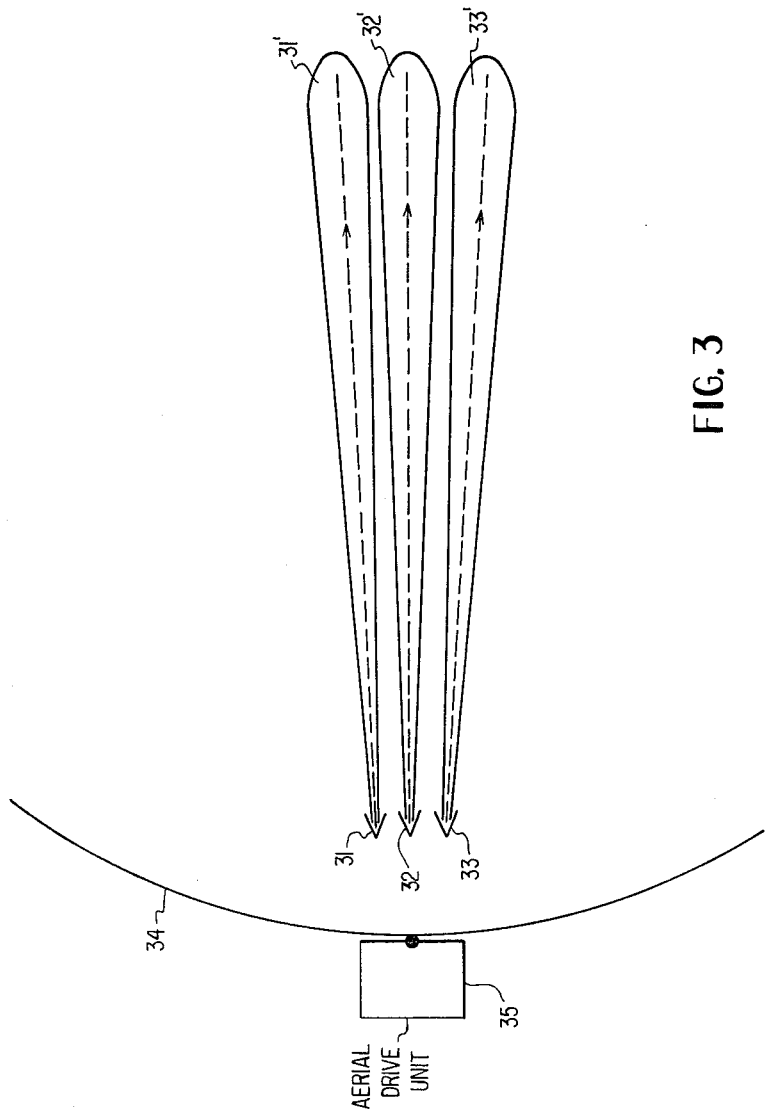

3,167,764
RADAR LOCATING SYSTEM EMPLOYING PLURAL TRANSMITTED FREQUENCIES
Edward Marshall Weils, Great Baddow, Essex, and John Hosking Blythe, Chelmsford, Essex, England, assignors to The Marconi Company Limited, London, England, a British company
Filed Oct. 23, 1961, Ser. No. 146,762
Claims priority, application Great Britain, Dec. 5, 1960, 41,746/60
5 Claims. (Cl. 343—10)

This invention relates to radar systems and more specifically to radar systems of the kind in which two or more beams of radio frequency energy are transmitted directionally to illuminate a target, information with regard to which is obtained by receiving and utilizing reflected waves due to two (or more) frequencies transmitted. Thus there are certain known radar systems in which the range of a moving target is ascertained by illuminating the said target with two beams of different frequencies and utilizing the reflected waves, also, of course, of two frequencies, to determine range. In more complex radar systems of the kind referred to there are more than two transmitted frequencies. In some systems the different frequencies are unmodulated: in others one or more of the transmitted frequencies is or are modulated. The present invention is applicable to these and other systems of the kind referred to.

In known radar systems of the kind referred to, the outputs from the oscillators producing the different frequencies are combined before transmission in space. This leads to very substantial inefficiency. In one class of known equipment the different frequencies are combined at a low power level and then amplified to a high power level by a common amplifier before transmission. In a second class of equipment low level signals of different frequencies are amplified by separate amplifiers and combined for transmission after such amplification. Neither method is of high efficiency. Because known available amplifiers—such, for example as Klystron amplifiers—suitable for use for amplification at micro-wave frequencies, are limited as to the voltages they will amplify linearly, equipment of the first mentioned (that with combination at a low power level and common amplification after combination) is inefficient because the total mean power of a microwave amplifier is less when used to amplify two signals of the same amplitude and different frequencies than it would be if used to amplify only one frequency. In practice, the reduction of mean power is usually to about ½ depending on the level at which spurious signals in the amplifier can be tolerated. With the second class of equipment, inefficiency occurs in the combining itself. In this class of equipment the two signal sources feed each through its own separate signal path to a junction point at which the combination signal path begins. In order that the signal sources shall not react unfavorably on each other it is necessary to include, in the two paths from the sources to the junction point, means for isolating each of the sources from signals originating in the other source and coming back from the junction point. One form which such isolating means may take is that of a so-called rotation isolator which is a device which will pass power in one direction with relatively small loss but will heavily attenuate power trying to pass in the opposite direction. If rotation isolators are used there is loss of the power provided from each source, in part in the isolator in the path from that source to the junction point and in part due to power absorption by the other isolator of power trying to pass back through it from the junction point. Here again the total attenuation experienced in practice is usually about ½.

If instead of rotation isolators, filters are used, one being designed to pass one frequency and reflect the other and the other passing said other frequency and reflecting said one frequency, there is still, in usual practice, about the same loss because, although there would be no loss if the filters were theoretically perfect, in normal practice they are far from being so. Moreover, the use of filters in this way is confined to those cases in which the frequencies are sufficiently separated to permit of satisfactory frequency selective filtering. Moreover, if, for any reason it is required to change the values of the frequencies, the filters may be correspondingly changed or modified and this is obviously a disadvantage. The present invention seeks to avoid the foregoing defects and limitations.

According to this invention in its broadest aspect a radar system of the kind referred to comprises means for transmitting a plurality of different frequency radio beams at a small angle to one another. In this way the above described difficulties and defects of known systems are avoided since each frequency may be separately amplified at high efficiency by its own amplifier while there is no energy combining circuit with its inevitable and substantial losses.

According to a feature of this invention, a radar system of the kind referred to comprises means for producing a plurality of different radio frequency signals, a plurality of amplifiers each arranged to amplify a different one of the produced radio frequency signals, means for directionally transmitting the different amplified signals in radio beams differing in direction by a small azimuthal angle or angles and means for swinging the transmitted beams together in a predetermined scanning path in azimuth.

A preferred form of radar system also comprises a corresponding plurality of reflected radio signal directional receiving means differing in direction by a small azimuthal angle or angles equal to the angle or angles between the transmitted beams, each of said receiving means being arranged and adapted to receive reflected energy produced by a different one of the transmitted beams, means for swinging said receiving means together in azimuth in correspondence with the azimuth swinging of the transmitted beams, a combining circuit for the reflected energies received by said receiving means, and signal channels of different time delays between said receiving means and said combining circuit, said time delays being so dimensioned in relation to the speed of scanning and the small azimuthal angular difference that the energies received by said receiving means due to the passage of the transmitted beams across a particular reflecting object arrive simultaneously at said combining circuit.

Preferably the polar diagrams of the different transmitted beams are such that substantially they do not overlap. This has the advantage that a transmitting aerial system, utilizing separate feeds (one for each frequency) in conjunction with a common directive reflector can be employed without causing interference difficulties due to near-by reflecting objects simultaneously reflecting more than one transmitting frequency. Also, of course, a plurality of feeds associated with a common reflector may be used for the receiving means.

In a preferred embodiment a radar system comprises two sources of different radio frequencies; separate amplifiers for signals from said suorces; means for directionally transmitting the amplified signals one on each of two radio beams having a small angle of azimuth between them; means for swinging the transmitted beams together in azimuth; a first mixer; means for feeding signals derived from said sources to said first mixer through paths having a time delay difference equal to the time taken in swinging in azimuth through said small angle, the path from the source providing the beam which leads in azimuthal swinging having the longer time delay; directional receiving means having directions of reception differing by said small angle of azimuth; means for swinging said receiving means together in azimuth in correspondence with the azimuthal swinging of the transmitted beams; a second mixer; means for feeding signals derived from the reflected signals received by said receiving means to said second mixer through paths having a time delay difference equal to and corresponding to the time delay difference of the paths between the aforesaid sources and the first mixer; a display cathode ray tube fed with and adapted to display output signals from the second mixer; and means controlled by output signals from the first mixer for deflecting the ray in said display tube. The display tube may conveniently be a P.P.I. (plan-position-indicator) display tube having a "brighten up" electrode fed with limited and differentiated output from the second mixer and mutually perpendicular deflection means fed respectively by the mutually perpendicular co-ordinate outputs of a so-called resolver fed with limited and integrated output from the first mixer.

Figure 2:
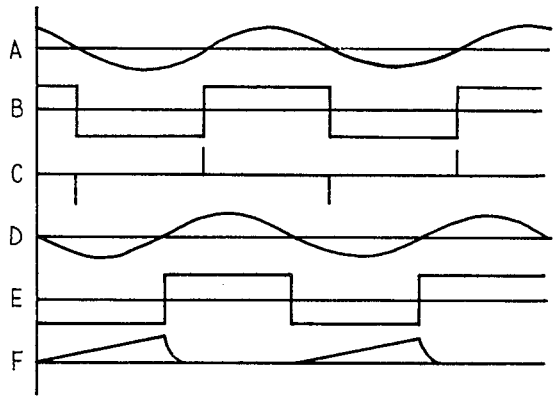

The invention is illustrated in the accompanying drawings in which FIGURE 1 is a higthly simplified schematic representation of one embodiment of the invention, FIGURE 2 is an explanatory graphical figure and FIGURE 3 shows diagrammatically an aerial drive unit and the resulting antenna lobe patterns.

Referring to FIGURE 1, 1 and 2 are simplified representations of two sources of radio frequency of different constant frequencies $f1$ and $f2$ for transmission. The signal outputs from these sources are amplified by separate transmitting amplifiers A1 and A2 and transmitted from aerials 3 and 4. These aerials are directional aerials of any known convenient form customarily employed in radar systems. Their directions are at a small azimuthal angle to one another, for example 7.2°, and their polar diagrams are such that the two transmitted beams substantially do not overlap in azimuth. The aerials are purely diagrammatically shown in FIGURE 1. In practice it is preferred to constitute them by a common parabolic or similar reflector with two feeds or primary sources co-operating with it, one feed being fed from one unit A1 and the other from the other unit A2. The double aerial system is rotated in azimuth at a desired speed, for example 60 r.p.m., while still maintaining the small angular separation of the two beams. The azimuthal rotation means, being well known, are not shown, the said rotation being represented merely by the curved arrow TA.

The receiving part of the equipment includes a double aerial system like the transmitting aerial system and represented by two aerials 5 and 6 having the same small angular separation as the aerials 3 and 4. The receiving aerial system is rotated in azimuth by the same means which are used for rotating the system 3–4 and at the same speed. This rotation is represented by the curved arrow RA. The polar diagrams are so directed that aerial 5 receives reflected signals produced by the transmission from aerial 3 on frequency $f1$ and aerial 6 similarly receives reflections of the beam transmitted by the aerial 4. In FIGURE 3 the antenna structure and associated patterns are shown diagrammatically. 31, 32 and 33 imply transmitting horns which are arranged in conjunction with a common directive reflector 34 in such a way to provide beams 31', 32', and 33' which have polar diagrams that do not overlap. The entire assembly is driven by aerial drive unit 35 which serves to position the reflector and associated transmitting horns in a conventional manner.

The reflected signals received by the aerial 5 and 6 are fed to mixer-receivers 7 and 8 respectively with which are associated a common local oscillator 9. Outputs from these mixer-receivers are fed to a mixer 11 through two paths, one of which contains a time delay device 10 giving a time delay equal to the time taken by the transmitted beams to sweep through their angle of separation. With an angle of separation of 7.2° and an azimuthal rotational speed of 60 r.p.m. this involves a time delay for the device 10 of about 20 millisecs. Such a time delay can be conveniently obtained by using a magnetic recording and pick-up delay device as well known per se for the device 10.

The output from the mixer 11 will comprise a difference frequency output $f1-f2$ of phase dependent on the range of the target. This output, represented in line A of FIGURE 2 is converted into a rectangular waveform as represented in line B of FIGURE 2 by means of a limiting and squaring circuit 12 as known per se. The output from the unit 12 is fed to a differentiator 13 which produces sharp pulses as shown in line C of FIGURE 2. These pulses are fed as "brighten up" pulses to the "brighten up" electrode represented by a grid G in a P.P.I. cathode ray display tube 14. This tube is of ordinary well known form but is purely diagrammatically represented in FIGURE 1 by means of an envelope shown as containing a cathode H, an auxiliary anode AA and mutually perpendicular pairs P1 and P2 of deflecting plates. The deflection could, of course, in practice be electro-magnetic and the tube has the usual fluorescent screen (not shown) and has associated with it the usual radial deflection time base means normally employed for P.P.I. presentation. As these and other details of the tube 14 and its associated circuitry form per se no part of this invention and are well known, they are not shown in FIGURE 2 in order to leave that figure as simple as possible.

It is, of course, necessary that the circular sweep waveform for ray deflection in the tube 14 shall commence at the correct time and FIGURE 1 shows diagrammatically one arrangement for insuring this. As will be seen signals from the sources 1 and 2 are fed into a mixer 16 through paths one of which includes a delay device 15 with the same delay as the device 10. Output from the mixer 16 is represented in line D of FIGURE 2 and this output is squared by a limiter-squarer 17 like that represented by the block 12. The output from unit 17 is represented in line E of FIGURE 2. This output is taken to an integrator 18 whose output is as represented in line F of FIGURE 2 and is fed to a resolver 19 providing mutually perpendicular co-ordinate outputs, one of which is fed to the plates P1 and the other of which is fed to the plates P2.

The invention is not limited to the particular form of radar system shown in FIGURE 1 and it will be clear that it may equally well be applied to radar systems of the kind referred to and which are more complex than the simple two-frequency unmodulated system chosen for illustration. For example, more than two frequencies may be transmitted on beams at small angular separations and received on correspondingly angularly spaced directional receiving means. Again the transmitted frequencies need not be unmodulated and one or more of them might be modulated, e.g. in accordance with saw-tooth modulation to derive as known per se range and/or velocity information about targets.

We claim:

1. A radar system of the kind referred to comprising means for producing a plurality of different radio frequency signals, a plurality of amplifiers each arranged to amplify a different one of the produced radio frequency signals, means for directionally transmitting the different amplified signals in radio beams differing in direction by small azimuthal angle or angles, means for swinging the transmitted beams together in a predetermined scanning path in azimuth, a corresponding plurality of reflected radio signal directional receiving means differing in direction by a small azimuthal angle or angles equal to the angle or angles between the transmitted beams, each of said receiving means being arranged and adapted to receive reflected energy produced by a different one of the transmitted beams, means for swinging said receiving means together in azimuth in correspondence with the azimuth swinging of the transmitted beams, a combining circuit for the reflected energies received by said receiving means, and signal channels of different time delays between said receiving means and said combining circuit, said time delays being so dimensioned in relation to the speed of scanning and the small azimuthal angular difference that the energies received by said receiving means due to the passage of the transmitted beams across a particular reflecting object arrive simultaneously at said combining circuit.

2. A radar system as claimed in claim 1 wherein the polar diagrams of the different transmitted beams are such that substantially they do not overlap.

3. A radar system as claimed in claim 1 wherein said means for directionally transmitting the different amplified signals comprises a transmitting aerial system having separate feeds (one for each frequency) in conjunction with a common directive reflector, and a plurality of feeds associated with a common reflector are used for reception.

4. A radar system comprising two sources of different radio frequencies; separate amplifiers for signals from said sources; means for directionally transmitting the amplified signals one on each of two radio beams having a small angle of azimuth between them; means for swinging the transmitted beams together in azimuth; a first mixer; means for feeding signals derived from said sources to said first mixer through paths having a time delay difference equal to the time taken in swinging in azimuth through said small angle, the path from the source providing the beam which leads in azimuthal swinging having the longer time delay; directional receiving means having directions of reception differing by said small angle of azimuth; means for swinging said receiving means together in azimuth in correspondence with the azimuthal swinging of the transmitted beams; a second mixer; means for feeding signals derived from the reflected signals received by said receiving means to said second mixer through paths having a time delay difference equal to and corresponding to the time delay difference of the paths between the aforesaid sources and the first mixer; a display cathode ray tube fed with and adapted to display output signals from the second mixer; and means controlled by output signals from the first mixer for deflecting the ray in said display tube.

5. A radar system as claimed in claim 4, and wherein the display tube is a P.P.I. display tube having mutually perpendicular deflection means and a "brighten up" electrode and wherein there are provided means connected to said second mixer for providing therefrom a limited and differentiated output, said "brighten up" electrode being connected to have said limited and differentiated output applied thereto, a resolver connected to said first mixer, the mutually perpendicular deflection means of said display tube being fed respectively by the mutually perpendicular coordinate outputs of the resolver.

References Cited by the Examiner

UNITED STATES PATENTS

| | | | |
|---|---|---|---|
| 2,422,691 | 6/47 | Mason | 343—102 |
| 2,974,317 | 3/61 | Klemperer | 343—7.7 |
| 3,120,659 | 2/64 | Wells et al. | 343—7.7 |

FOREIGN PATENTS

| | | |
|---|---|---|
| 580,978 | 9/46 | Great Britain. |

CHESTER L. JUSTUS, *Primary Examiner.*